(No Model.)
W. C. CARLTON & C. H. SEBREE.
CUTTER ATTACHMENT FOR MOWING MACHINES.
No. 534,855. Patented Feb. 26, 1895.
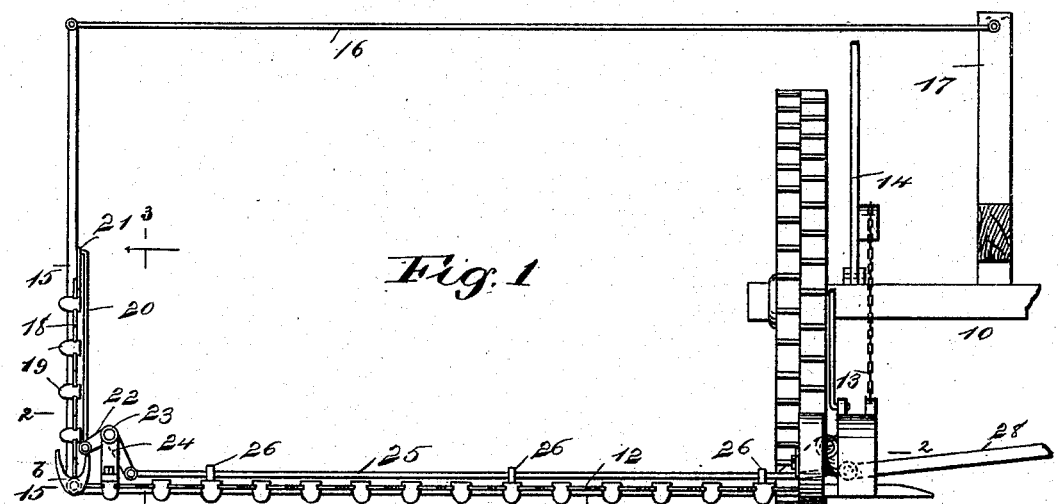
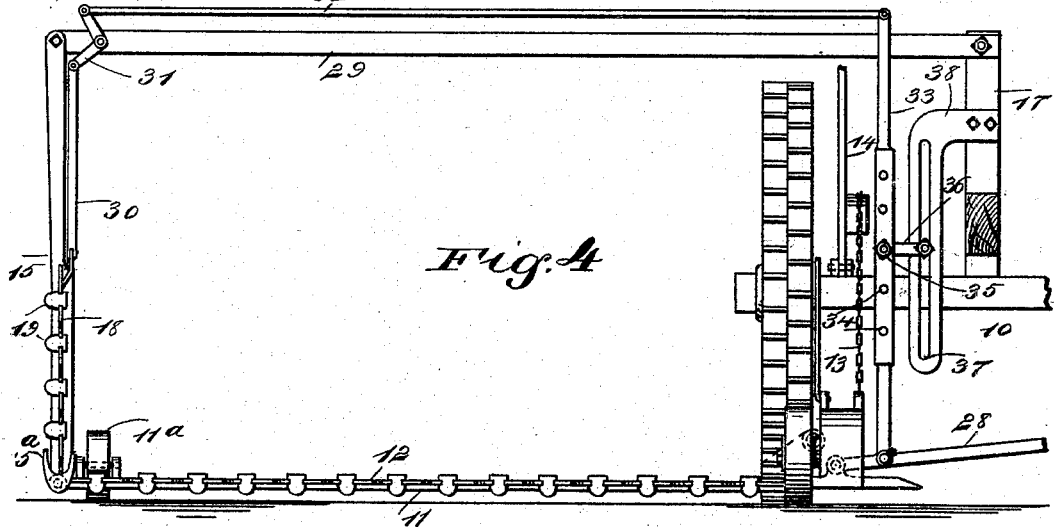
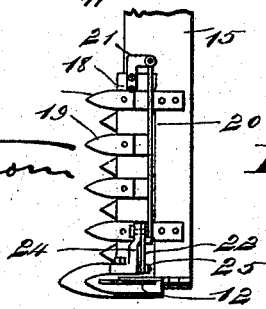
WITNESSES:
INVENTORS
W. C. Carlton
C. H. Sebree
BY Munn & Co.
ATTORNEYS.

UNITED STATES PATENT OFFICE.

WILLIAM C. CARLTON, OF ROCKVILLE, AND CHARLES H. SEBREE, OF CALDWELL, IDAHO.

CUTTER ATTACHMENT FOR MOWING-MACHINES.

SPECIFICATION forming part of Letters Patent No. 534,855, dated February 26, 1895.

Application filed March 28, 1894. Serial No. 505,437. (No model.)

*To all whom it may concern:*

Be it known that we, WILLIAM C. CARLTON, of Rockville, in the county of Owyhee, and CHARLES H. SEBREE, of Caldwell, in the county of Canyon, State of Idaho, have invented a new and Improved Cutter Attachment for Mowing and Reaping Machines, of which the following is a full, clear, and exact description.

Our invention relates to improvements in cutter attachments; and the object of our invention is to produce an attachment of this kind which may be applied to a mowing machine or reaping machine of any ordinary kind, and which employs a vertically reciprocating cutter bar arranged at the outer end of the ordinary horizontal cutter or sickle bar. With the ordinary mowing machine great difficulty is experienced in cutting very heavy grass, particularly alfalfa, clover, and the like. As the heavy grass drops down over the swath which has been cut, and in making the next round, the operator is likely to run in or out too far, as he cannot clearly distinguish the line, and either leaves a portion of the grass uncut, thus making a ragged field, and interfering with the raking, or else he cuts a narrow swath and chops up a portion of the grass which has been already mowed.

Our invention is intended to obviate this difficulty and to provide a simple and efficient means for cutting the grass vertically at the end of the main finger bar, so as to leave a clear and well defined line which it is very easy to follow.

To these ends our invention consists of certain features of construction and combinations of parts, which will be hereinafter described and claimed.

Reference is to be had to the accompanying drawings, forming part of this specification, in which similar figures of reference indicate corresponding parts in all the views.

Figure 1 is a broken front elevation of a mowing machine provided with our improved cutter attachments. Fig. 2 is a sectional plan on the line 2—2 of Fig. 1. Fig. 3 is a detail section on the line 3—3 of Fig. 1, showing the vertical bar in elevation; and Fig. 4 is a broken sectional elevation of a mowing machine provided with a modified means of working the vertical cutter.

The mowing machine 10 may be of any approved kind and it is provided with the ordinary horizontal finger bar carrying the reciprocating cutter or sickle 12 and has means, such as the chain 13 and lever 14, for raising the finger bar. The finger bar 11 has hinged or solidly bolted to its outer end a vertical cutter bar 15, which at the bottom has a guard or finger 15$^a$, see Fig. 2, fitting snugly in the main guard shoe 15$^b$ of the horizontal finger bar, and the finger bar 15 is braced at its upper end by the rod 16 which is pivoted to it and also to a standard 17 on the machine frame or tongue.

The finger bar 15 carries a vertically reciprocating cutter 18 which is like the ordinary cutter or sickle of a mowing machine, and this reciprocates in the usual guards 19 which are attached to the finger bar 15. The cutter 18 as illustrated in Figs. 1 to 3, is moved by a pitman 20, which is secured to the upper end of the cutter by means of an arm 21 or equivalent fastening, and the pitman is, at its lower end, pivoted to one arm of a bell crank 22 which is fulcrumed at its elbow, as shown at 23, being mounted in a bracket 24 on the finger bar 11, or vertical finger bar 15, and the other arm of the bell crank is pivoted to a connecting rod 25 which works in keepers 26 on the finger bar and is, at its inner end, pivoted to the cutter head 27, or pitman 28, this being operated by the pitman 28 and the latter worked by gearing, not shown, in the usual way.

It will be seen that when the pitman 28 and cutter head 27 are reciprocated to move the main cutter or sickle 12, the connecting rod 25 will be also reciprocated, the bell crank 22 tilted, and the pitman 20 and sickle or cutter 18 reciprocated vertically. Thus while the machine is moving in the ordinary way, the vertically reciprocating cutter 18 will be dividing the grass at one end of the main cutter or sickle so as to leave the swath clear and well marked.

It will be understood that the vertical cutter 18 may be moved in different ways without departing from the principle of our invention as set forth in the claim, and in Fig. 4 we have illustrated another means of moving it and also of supporting it. As here shown, the main finger bar is provided with the ordinary guard wheel 11ª and the finger bar 15 is, at the top, connected by a brace 29 with the standard 17 of the machine, while the cutter 18 is at its upper end secured to a pitman 30 which is pivoted to a bell crank 31 fulcrumed on the brace 29, the upper arm of this bell crank being also connected by a rod 32 with a tilting lever 33 which is arranged in a nearly vertical position on the machine frame, being provided with a series of holes 34 to receive its pivot bolt 35 and, by adjusting this bolt in the holes the lever may be arranged so as to change the stroke of the vertical cutter.

The lever 33 is supported on a strap or bracket 36, which is also vertically adjustable and is fastened by a bolt in the slot 37 of the bracket or hanger 38 which is secured to the standard 17 or other convenient portion of the frame. The lower end of the lever 33 is pivoted to the pitman 28 and, as the latter reciprocates in moving the main cutter or sickle, it tilts the lever 33 which, acting on the rod 32, bell crank 31 and pitman 30, reciprocates the cutter 18.

Having thus described our invention, we claim as new and desire to secure by Letters Patent—

The combination with the main finger bar and the sickle bar adapted to move longitudinally thereof, of the auxiliary finger bar whose lower end is secured to the outer end of the main finger bar, said finger bars being arranged at an angle to each other, the operating pitman of the main sickle bar, a rod connected to the said pitman, a bell crank lever one arm of which is connected to the said rod, so that the said lever receives its motion directly from the said pitman, without the main sickle bar as an intermedium, so as to avoid strain on the said sickle bar, another pitman one end of which is pivotally connected to the other arm of the bell crank lever, and an auxiliary sickle bar pendent from the other end of the said second pitman and adapted to reciprocate longitudinally of the auxiliary finger bar, substantially as described.

WILLIAM C. CARLTON.
CHARLES H. SEBREE.

Witnesses:
W. F. SCHNABEL,
W. R. SEBREE.